United States Patent [19]

Yukawa et al.

[11] Patent Number: 5,296,529
[45] Date of Patent: Mar. 22, 1994

[54] SELF-CROSSLINKING RESIN

[75] Inventors: Yoshiyuki Yukawa, Hiratsuka; Motoshi Yabuta, Hadano; Akimasa Nakahata, Hiratsuka; Kazunori Mayumi, Aichi, all of Japan

[73] Assignee: Kansai Paint Company, Limited, Amagasaki, Japan

[21] Appl. No.: 100,994

[22] Filed: Aug. 3, 1993

[30] Foreign Application Priority Data

Aug. 18, 1992 [JP] Japan .................................. 4-219087

[51] Int. Cl.$^5$ .............................................. C08G 81/02
[52] U.S. Cl. .................................... 524/513; 525/124; 525/131; 525/175
[58] Field of Search ...................... 525/175, 124, 131; 524/513

[56] References Cited

U.S. PATENT DOCUMENTS 4,539,218  9/1985  Geist .................................... 525/124

Primary Examiner—Patricia A. Short
Attorney, Agent, or Firm—Armstrong, Westerman, Hattori, McLeland & Naughton

[57] ABSTRACT

The present invention provides (1) a self-crosslinking resin (I) having a carboxyl group, a blocked isocyanate group and a hydroxyl group in the molecule and characterized in that the resin is prepared from a vinyl polymer (A) having at least two free isocyanate groups in the molecule and a polyester resin (B) having at least two hydroxyl groups and at least one carboxyl group in the molecule by reacting some of the hydroxyl groups of the resin (B) with some of the free isocyanate groups of the polymer (A), and subsequently reacting a blocking agent with all the remaining free isocyanate groups, and (2) a self-crosslinking resin (II) having a carboxyl group, a blocked isocyanate group and a hydroxyl group in the molecule and characterized in that the resin is prepared from a vinyl polymer (C) having a free isocyanate group and a blocked isocyanate group in the molecule and the polyester resin (B) having at least two hydroxyl groups and at least one carboxyl group in the molecule by reacting some of the hydroxyl groups of the resin (B) with all the free isocyanate groups of the polymer (C).

12 Claims, No Drawings

SELF-CROSSLINKING RESIN

The present invention relates to novel self-crosslinking resins having within the molecule a blocked isocyanate group and a hydroxyl group which are reactive groups complementary to each other, the resins being useful for aqueous adhesive compositions, coating compositions, etc.

Two-pack or single-pack coating compositions wherein polyester polyol or like hydroxyl-containing polymer is cured with an isocyanate crosslinking agent produce cured coatings which are excellent in chemical resistance, physical properties, etc. and are therefore in wide use, for example, as motor vehicle coating compositions.

However, the two-pack composition has problems as to safety and hygiene when the isocyanate crosslinking agent is admixed with the other component or when the composition is applied, and further has the drawbacks that the coating preparation obtained by mixing the two components together has a short pot life before application, becomes viscous during coating operations and presents difficulty in cleaning the coating device. Single-pack coating compositions incorporating a blocked isocyanate crosslinking agent require a baking temperature usually of at least 150° C. because the blocking agent has a high dissociation temperature. These compositions have the drawback of being unusable for plastics materials which require baking at a low temperature (up to 120° C.). The single-pack composition has the further drawback of being not always satisfactory in the compatibility of the corsslinking agent, i.e., blocked isocyanate, with the polyester polyol serving as the base resin, such that even if they are compatible, the cured coating formed differs in composition between the surface and the interior when observed microscopically and is low in curability, gloss and surface smoothness.

To overcome these drawbacks, Unexamined Japanese Patent Publication No. 186722/1988 discloses a self-crosslinking resin which is prepared by copolymerizing a polymerizable monomer containing an isocyanate group or such a monomer having a blocked isocyanate group with a polymerizable monomer containing a hydroxyl group to introduce the complementary reactive groups into the molecule.

Nevertheless, preparation of the disclosed resin involves problems. When a radically polymerizable monomer containing an unblocked isocyanate group is copolymerized with a hydroxyl-containing radically polymerizable monomer as disclosed in the publication, it is difficult to prevent the reaction between the isocyanate group and the hydroxyl group even if the copolymerization reaction is conducted at the lowest possible temperature, with the result that gelation is liable to occur during the reaction. The polymerization reaction has other problems with respect to initiators. Since the isocyanate-containing monomer is a derivative of α-methylstyrene according to the publication, the monomer is low in polymerization reactivity, and azo polymerization initiators fail to achieve a sufficient polymerization conversion, whereas peroxide or carbonate initiators, if used, require a temperature of at least 100° C. for the polymerization when a high conversion of polymerization is to be attained.

On the other hand, gelation is less likely to occur during the polymerization reaction when blocked isocyanate-containing polymerizable monomers are used. However, especially when the polymerizable monomer used contains an isocyanate group blocked with a phenol or oxime blocking agent, there arises a need to conduct the reaction at a relatively high temperature (120° to 140° C.), which entails the drawback of seriously coloring the product. If other blocking agents are used, a higher dissociation temperature will result, so that the self-crosslinkable resin obtained requires heating at a high temperature (at least 170° C.) for curing. When heated at a low temperature (e.g. up to 120° C.), the resin will not always be cured satisfactorily.

As is already well known, aqueous coating compositions have become more and more important from the viewpoint of air pollution control and savings in resources. Nevertheless, the crosslinking agents predominantly used for aqueous coating compositions are still water-soluble melamine resins, which have problems in respect of curability and resistance to chemicals. Furthermore, the conventional blocked isocyanate crosslinking agents are difficult to use for aqueous coating compositions because they require heating at a high temperature as stated above, are not fully compatible with the base resin and afford markedly colored coatings.

An object of the present invention is to provide a novel self-crosslinking resin which has a polyester resin skeleton and which can be prepared by a reaction without entailing gelation, coloration and a reduction in polymerization conversion.

Another object of the invention is to provide an anionic self-crosslinking resin especially useful as an aqueous resin, having a blocked isocyanate group and a hydroxyl group in the molecule and usable to provide single-pack compositions which are at least comparable to conventional two-pack compositions in coating properties and which can be handled and used for coating without any cumbersomeness unlike two-pack coating compositions and can be made curable at a low temperature.

These and other objects of the present invention will become apparent from the following description.

The present invention provides:

(1) a self-crosslinking resin (I) having a carboxyl group, a blocked isocyanate group and a hydroxyl group in the molecule and characterized in that the resin is prepared from a vinyl polymer (A) having at least two free isocyanate groups in the molecule and a polyester resin (B) having at least two hydroxyl groups and at least one carboxyl group in the molecule by reacting some of the hydroxyl groups of the resin (B) with some of the free isocyanate groups of the polymer (A), and subsequently reacting a blocking agent with all the remaining free isocyanate groups, and (2) a self-crosslinking resin (II) having a carboxyl group, a blocked isocyanate group and a hydroxyl group in the molecule and characterized in that the resin is prepared from a vinyl polymer (C) having a free isocyanate group and a blocked isocyanate group in the molecule and the polyester resin (B) having at least two hydroxyl groups and at least one carboxyl group in the molecule by reacting some of the hydroxyl groups of the resin (B) with all the free isocyanate groups of the polymer (C).

The self-crosslinking resins (I) and (II) of the present invention will be described below in greater detail.

The self-crosslinking resin (I) has a carboxyl group, a blocked isocyanate group and a hydroxyl group in the molecule and is prepared from a vinyl polymer (A)

having at least two free isocyanate groups in the molecule and a polyester resin (B) having at least two hydroxyl group and at least one carboxyl group in the molecule by reacting some of the hydroxyl groups of the resin (B) with some of the free isocyanate groups of the polymer (A), and subsequently reacting a blocking agent with all the remaining free isocyanate groups.

Stated more specifically, the vinyl polymer (A), which has at least two free isocyanate groups in the molecule, is a polymer consisting essentially of an isocyanate-containing vinyl monomer (hereinafter referred to as the "NCO-containing monomer"), and further comprising other vinyl monomer when required. The polymer is mostly a straight-chain polymer having terminal and/or side chain isocyanate groups.

The NCO-containing monomer is a compound having at least one unblocked free isocyanate group and at least one radically polymerizable double bond in the molecule. Examples of such compounds are methacryloyl isocyanate, 2-isocyanate ethyl methacrylate, m- or p-isopropenyl-α,α'-dimethylbenzyl isocyanate and an addition product of a hydroxyl-containing vinyl monomer with a diisocyanate compound in a mole ratio of 1:1. One or at least two of these compounds are usable.

The hydroxyl-containing vinyl monomer for use in preparing the NCO-containing monomer is a compound having at least one hydroxyl group and at least one radically polymerizable double bond in the molecule. Exemplary of such compounds are 2-hydroxyethyl (meth)acrylate, 2-hydroxypropyl (meth)acrylate, hydroxybutyl acrylate, 2,3-dihydroxypropyl acrylate, 2-hydroxy-3-phenoxyethyl acrylate, 2-hydroxy-3-ethoxyethyl acrylate and the like. Also usable is an equimolar adduct of acrylic acid or methacrylic acid with a glycol (having 2 to 20 carbon atoms).

The diisocyanate compound to be used for preparing the NCO-containing monomer is a compound having two isocyanate groups in the molecules. Examples of such compounds are aliphatic, aromatic and alicyclic diisocyanate compound including tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4(2,6)-diisocyanate, isophorone diisocyanate and trimethylhexane diisocyanate.

Preferable among these NCO-containing monomers are 2-isocyanate ethyl methacrylate, m-isopropenyl-α,α'-dimethylbenzyl isocyanate and an equimolar adduct of 2-hydroxyethyl acrylate with isophorone diisocyanate.

The vinyl polymer (A) is obtained by polymerizing such an NCO-containing monomer only, or copolymerizing the monomer with other vinyl monomer.

The other vinyl monomer is preferably a compound having a radically polymerizable double bond in the molecule but not having active hydrogen reactive with the isocyanate group. Examples of such compounds are styrene, α-methylstyrene, vinyltoluene and like aromatic vinyl monomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; Viscose 3F (brand name, product of Osaka Organic Chemical Industry Ltd., the same as hereinafter), Viscose 3MF, 8F and 8MF, perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-dimethylaminoethyl (meth)acrylate, N,N'-diethylaminomethyl (meth)acrylate, N,N'-diethylaminoethyl (meth)acrylate, N,N'-diethyl (meth)acrylamide and like nitrogen-containing vinyl monomers; vinyl ethyl ether, vinyl butyl ether and like vinyl ether monomers; and glycidy (meth)acrylate, 3,4-epoxycyclohexylmethyl (meth)acrylate, arylglycidyl ether, alkyl-etherified methylolacrylamide, (meth)acrylamide, (meth)acrylic acid chloride, vinyl chloride, vinylidene chloride, (meth)acrylonitrile, γ-methacryloxyalkyltrimethoxysilane, etc. These compounds are used singly, or at least two of them are used in admixture.

The ratio of the NCO-containing monomer to the other vinyl monomer is not limited specifically insofar as the resulting polymer (A) has at least two free isocyanate groups in the molecule. The ratio of NCO-containing monomer/other vinyl monomer (by weight) is suitably 100/0 to 1/99, preferably 65/35 to 30/70.

The polymerization reaction of the NCO-containing monomer only or of this monomer with other vinyl monomer is usually conducted preferably in an inert organic solvent free from active hydrogen reactive with isocyanate groups. Examples of useful inert organic solvents are hexane, heptane, octane and like aliphatic hydrocarbons, benzene, toluene, xylene and like aromatic hydrocarbons, esters/ ketones, etc. These solvents are used singly or in admixture. These solvents are likely to contain water, which is therefore preferably removed before use as required. In the case where the self-crosslinking resin of the invention is to be made aqueous, also preferable as inert organic solvents are hydrophilic or water-soluble solvents free from active hydrogen, such as diethylene glycol dimethyl ether and ethylene glycol dimethyl ether.

The polymerization reaction is conducted usually at a temperature of 50° to 180° C. in the presence of a radical polymerization initiator. The molecular weight of the polymer (A) is adjustable, for example, by varying the concentration of the reaction system or the amount of initiator. The concentration of the reaction system is in a range of 20 to 80 wt. % calculated as the polymer. To achieve an improved polymerization conversion, it is especially desirable to use a peroxide or carbonate initiator and conduct the reaction at a temperature of at least 100° C. It is more preferable to use an acrylate monomer in combination with the above monomer or monomers, whereby the polymer can be obtained with ease at a higher polymerization conversion. Although the polymerization initiator is usable at a concentration of 0.01 to 15 wt. % based on the whole amount of monomer or monomers, the concentration is preferably in a range of 0.1 to 10 wt. %.

For the polymerization, an electron beam, ultraviolet rays or the like can be used alternatively instead of the polymerization initiator.

Besides radical polymerization, ion polymerization or group transfer polymerization can be resorted to.

The polymer (A) for use in the present invention is preferably 500 to 50000, more preferably 1500 to 30000, in weight average molecular weight. Suitably, the polymer is 30 to 200 g/1000 g resin in isocyanate value.

The polymer (A), which has at least two free isocyanate groups in the molecule, is preferably free from any active hydrogen reactive with the isocyanate groups.

The polyester resin (B) is a polyester resin having at least two hydroxyl groups and at least one carboxyl group in the molecule. The polyester resin (B) consists essentially of a polybasic acid and/or an ester thereof (B-1) having at least two carboxyl groups in the molecule and a polyhydric alcohol (B-2) having at least two hydroxyl groups in the molecule, and further comprises a fatty acid and/or a fatty acid ester (B-3) when required. The resin is obtained by esterification or ester exchange reaction.

Examples of useful polybasic acids (B-1) are phthalic acid (anhydride), terephthalic acid, isophthalic acid, tetrahydrophthalic acid (anhydride), hexahydrophthalic acid (anhydride), 4-methylhexahydrophthalic acid (anhydride), 3-methylhexahydrophthalic acid (anhydride), 3-methyltetrahydrophthalic acid (anhydride), trimellitic acid (anhydride), pyromellitic acid (anhydride), HET acid (anhydride), 3,6-endomethylenetetrahydrophthalic acid (anhydride), adipic acid, sebacic acid, azelaic acid, succinic anhydride, maleic anhydride, fumaric acid, itaconic acid, dimethyl isophthalate, dimethyl terephthalate, etc.

The polyhydric alcohol (B-2) is a compound having at least two alcoholic or phenolic hydroxyl groups in the molecule. Examples of such compounds are ethylene glycol, diethylene glycol, triethylene glycol, polyethylene glycol, 1,6-hexanediol, pentanediol, cyclohexanone dimethanol, propylene glycol, butylene glycol, butylene diglycol, trimethylolethane, trimethylolpropane, glycerin, neopentyl glycol, sorbitol, tris(2-hydroxyethyl)isocyanurate, diethanolamine, diisopropanolamine, bisphenol A, bisphenol F, etc.

Examples of useful fatty acids (B-3) are safflower oil fatty acid, linseed oil fatty acid, soybean oil fatty acid, perilla oil fatty acid, corn oil fatty acid, tall oil fatty acid, sunflower oil fatty acid, cotton seed oil fatty acid, tung oil fatty acid and like (semi)drying oil fatty acids, coconut oil fatty acid, olive oil fatty acid, palm oil fatty acid and like nondrying oil fatty acids. Also usable are triglycerides and like esters of these acids.

Also usable as the polyester resin (B) is a resin obtained by ring opening polymerization of ε-caprolactam. Examples of such resins are Placcel 208, 240, 305 and 308 manufactured by Daicel Chemical Industries Ltd.

In preparing the polyester resin (B), hydroxyl groups and carboxyl groups can be introduced into the resin by known methods. First, hydroxyl groups can be introduced using a compound having at least three hydroyxl groups in the molecule and selected from the above-mentioned polyhydric alcohols (B-2). Carboxyl groups can be introduced using a compound having at least three carboxyl group in the molecule add selected from the foregoing polybasic acids (B-1). Carboxyl groups can be introduced also by reacting the compounds (B-1) and (B-2) (and the component (B-3) when desired) and reacting the component (B-1) with the reaction product for half-esterification. Use of an acid anhydride in the latter method effects ring opening by half-esterification, whereby free carboxyl groups can be introduced.

According to the present invention, it is generally desired that the polyester resin (B) have an acid value (mg KOH/g resin) of 15 to 200, preferably about 20 to about 110, and a hydroxyl value (mg KOH/g resin) of about 5 to about 400, preferably about 20 to about 200. If the acid value is less than 15, the resin obtained will be lower in dispersibility and solubility in water, whereas if it is greater than 200, the coating prepared from the resin on curing is likely to exhibit impaired water resistance. If the hydroxyl value is less than about 5, the self-crosslinking resin obtained exhibits impaired curability when applied, forming coatings which are lower in hardness, bending resistance and other properties. Conversely hydroxyl values greater than about 400 are undesirable since the coatings then obtained are inferior in water resistance, corrosion resistance and like properties.

It is generally desired that the polyester resin (B) have a weight average molecular weight of about 500 to about 50000, preferably about 1000 to about 30000, and a softening point of up to 150° C., preferably up to about 115° C.

The esterification reaction of the foregoing components for preparing the polyester resin (B) is conducted preferably in the presence of an organic solvent. For the introduction of urethane bonds due to a urethanation reaction between the vinyl polymer (A) and the resin (B), the organic solvent to be used for the esterification reaction is usually preferably an inert organic solvent free from any active hydrogen reactive with the isocyanate group. Examples of suitable solvents are those exemplified for the preparation of the polymer (A). Also suitable are hydrophilic or water-soluble solvents free from active hydrogen, such as diethylene glycol dimethyl ether, ethylene glycol dimethyl ether and the like.

On the other hand, in the case where the polyester resin (B) is prepared in an organic solvent having active hydrogen, the reaction mixture can be distilled in a vacuum, concentrated or spray-dried to remove the organic solvent and thereafter used for urethanation reaction with the polymer (A).

The reaction between the vinyl polymer (A) and the hydroxyl- and carboxyl-containing polyester resin (B) for preparing the self-crosslinking resin (I) is a urethanation reaction between the isocyanate group and the hydroxyl group. Stated more specifically, the urethanation reaction is conducted by admixing the polyester resin (B) with an organic solvent solution of the vinyl polymer (A) and heating the mixture usually at a temperature of 20° to 100° C., preferably 25° to 60° C. The reaction is controlled with reference to the reduction in the amount of isocyanate groups, i.e., isocyanate value. When required, tin compound or like catalyst may be used for this reaction. Suitably, the amount of polyester resin (B) to be used is such that the functional group ratio of the vinyl polymer (A) to the polyester resin (B), that is, the NCO/OH ratio, is 0.1 to 10.0, preferably 0.5 to 5.0. Further based on the combined amount by weight of the two components, it is suitable to use 1 to 99 wt. %, preferably 10 to 70 wt. %, of the vinyl polymer (A) and 1 to 99 wt. %, preferably 30 to 90 wt. %, of the polyester resin (B). The proportions of these components are further such that the vinyl polymer (A), when having a weight average molecular weight of 500 to 50000, can be given an average of at least 0.1 urethane bond as introduced therein per molecule. The number of urethane bonds to be introduced into the vinyl polymer (A) is preferably 0.5 to 1.5, most preferably 1, per molecule when the polymer has a weight average molecular weight of 1000 to 30000.

To conduct the reaction between the component (A) and the component (B) without gelation and to render the resulting resin curable at a low temperature, it is especially desirable to use m-isopropenyl-α,α'-dimethylbenzyl isocyanate having a tertiary isocyanate group as the NCO-containing monomer of the component (A).

Thus, the vinyl polymer (A) has the polyester resin (B) added thereto and urethane bonds introduced therein by the reaction of the resin (B) with the polymer (A). The free isocyanate groups remaining in the vinyl polymer (A) are then reacted with a blocking agent and thereby completely blocked to obtain the self-crosslinking resin (I). Examples of useful blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenols; methanol, ethanol, propanol, butanol, ethylene glycol, methyl cellosolve, butyl cellosolve, methyl carbitol, benzyl alcohol, phenyl cellosolve, furfuryl alcohol, cyclohexanol and like alcohols; dimethyl malonate, ethyl acetoacetate and like active methylene compounds; butyl mercaptan, thiophenol, tert-dodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, acetoxime, methyl ethyl ketoxime, methyl isobutyl ketoxime, cyclohexanoneoxime and like oximes; sodium bisulfite, potassium bisulfite and like sulfites; $\epsilon$-caprolactam, $\delta$-valerolactam, $\gamma$-butyrolactam, $\beta$-propiolactam and like lactams; etc. Especially preferable among these examples are phenol, lactam, alcohol and oxime blocking agents, while oxime blocking agents are most preferable in the case where baking at a low temperature (up to 120° C.) is required.

As a rule, it is desirable to use the blocking agent in an amount necessary to react with all the remaining free isocyanate groups.

The reaction between the blocking agent and the polymer (A) having the polyester resin (B) added thereto is conducted usually at a temperature of 20° to 100° C. When required, a tin compound catalyst or the like may be used.

The self-crosslinking resin (II) has a carboxyl group, a blocked isocyanate group and a hydroxyl group in the molecule and is prepared from a vinyl polymer (C) having a free isocyanate group and a blocked isocyanate group in the molecule and the hydroxyl- and carboxyl-containing polyester resin (B) by reacting some of the hydroxyl groups in the resin (B) with all the free isocyanate groups in the polymer (C).

More specifically, the vinyl polymer (C), which has a free isocyanate group and a blocked isocyanate group in the molecule, is obtained by reacting a blocking agent with some of the free isocyanate groups in the vinyl polymer (A).

Especially preferable as the vinyl polymer (A) for use in preparing the vinyl polymer (C) is a vinyl polymer (A) which is obtained using any of the above examples of NCO-containing monomers, preferably, for example, 2-isocyanate ethyl methacrylate, m-isopropenyl-$\alpha,\alpha$-dimethylbenzyl isocyanate or an equimolar adduct of isophorone diisocyanate with 2-hydroxyethyl acrylate.

The blocking agent is admixed with the polymer (A) in an amount required to allow free isocyanate groups to remain in the polymer in such an amount that the subsequent reaction with the polyester resin (B) will introduce approximately the same amount of urethane bonds into the polymer (A) as in the case of the self-crosslinking resin (I). It is especially desirable to use and react the blocking agent in an amount which allows free isocyanate groups to remain in such an amount that one urethane bond can be introduced into the polymer (A) per molecule thereof and which is needed to completely block the other free isocyanate groups.

Some of the hydroxyl groups in the polyester resin (B) are then reacted with all the remaining free isocyanate groups in the polymer (C) which is prepared by reacting the blocking agent with the polymer (A), whereby the self-crosslinking resin (II) is obtained. Thus, it is required that the amount of hydroxyl groups in the resin (B) be larger than that of remaining free isocyanate groups.

The reaction of the blocking agent with the polymer (A) and the reaction of the resin (B) with the polymer (C) for preparing the self-crosslinking resin (II) are carried out in the same manner as those already described for the self-crosslinking resin (I).

With the self-crosslinking resins (I) and (II) of the present invention, the blocked isocyanate-containing polymer (A) and the polyester resin (B) molecule are linked by a urethane bond formed by the reaction of the isocyanate group with the hydroxyl group. Accordingly, these resins are graft polymers of both resin molecules.

The self-crosslinking resins (I) and (II) thus obtained have at least one blocked isocyanate group and at least one hydroxyl group, and at least one carboxyl group, and are preferably about 1000 to about 120000, more preferably about 5000 to about 50000, in weight average molecular weight and about 15 to about 200, more preferably 20 to 110, in acid value (mg KOH/g resin).

When required, the carboxyl group of the self-crosslinking resin of the invention is neutralized with a base, and the resin is then admixed with water or a mixture of water and a hydrophilic organic liquid to give an anionic aqueous self-crosslinking resin.

The neutralizing agent for the carboxyl group is not limited specifically insofar as it is a base. Examples of suitable neutralizing agents are ammonia, methylamine, ethylamine, monoethanolamine, cyclohexylamine, dimethylamine, diethylamine, methyl ethanolamine, diethanolamine, ethylenediamine, triethylamine, and like primary, secondary or tertiary amines. Inorganic compounds such as caustic soda and caustic potash are also usable as neutralizign agents. Although the amount of the base to be used is variable with the proportion of carboxyl groups in the resin, it is usually an amount sufficient to neutralize about 20 to 100 mole % of the carboxyl groups. For example, water, a hydrophilic organic liquid or additives may be added to the resin before or simultaneously with neutralization.

An aqueous liquid is admixed with the neutralized resin with stirring, or the resin is admixed with the aqueous liquid with stirring, whereby an aqueous composition having an optional resin solids content is obtained. The resin solids content of the aqueous composition, although not limited specifically, is usually about 5 to about 90 wt. %.

The aqueous self-crosslinking resin composition thus prepared contains a resin having at least one blocked isocyanate group and at least one hydroxyl group, so that heating of the composition produces a regenerated isocyanate group, which reacts with the hydroxyl group. Although available as a single-pack composition, the composition is therefore self-crosslinkable.

When the self-crosslinking resins (I) and (II) of the invention have equal amounts of blocked isocyanate and hydroxyl in the molecule, these resins produce self-crosslinking coatings having the highest degree of crosslinking. For use in coating compositions, adhesive compositions and the like, however, it is desired that either one of the functional groups be present in excess in view of adhesion to substrates and adjoining layers. Suitably, the resins are about 5 to about 400, preferably 20 to 200, in hydroxyl value (mg KOH/g resin), and about 5 to about 250 in isocyanate value (g/1000 g resin).

The term "isocyanate value" as used herein refers to the content of free isocyanate groups in the resin. However, with resins having blocked isocyanate groups, these isocyanate groups are taken as unblocked in determining the isocyanate value.

The self-crosslinking resins of the invention can be dissolved or dispersed in water and/or organic solvents for use as coating compositions, adhesive compositions, printing inks, etc.

When the resin of the invention is to be used as a coating composition or the like, coloring pigments, metallic pigments, fillers, curing catalysts, surface conditioning agents, deterioration preventing agents, etc. are added to the resin as required to prepare a singlepack coating composition for use. Also usable with the resin of the invention are other ingredients including polyols, reactive diluents and other crosslinking agents (e.g., melamine resin, blocked isocyanates, and epoxy, acid, alkoxysilane and like compounds).

Examples of useful curing catalysts are tetraisopropyl titanate, tetrabutyl titanate, lithium acetate, iron(III) acetylacetonate, zinc 2-ethylhexonate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-n-butyl-1,3-dilauryloxydistannoxane and like metal-containing catalysts. These metal-containing catalysts may be used singly, or at least two of them are usable in admixture. Also preferably usable are tertiary amines such as trimethylamine, triethylamine, dimethylcyclohexylamine, N-tetramethylhexane-1,6-diamine, N-pentamethyldiethylenetriamine and 2-methyl-1,4-diazabicyclo[2,2,2]octane. Especially preferable are tin octylate, dibutyltin diacetate, dibutyltin dilaurate, distannoxanes and like organotin compounds. Dibutyltin diacetate is suitable to use in the case where baking at low temperatures is required. The amount of the curing catalyst to be used is usually about 0 to about 5 wt. % relative to the self-crosslinking resin although variable depending on the kind thereof.

When the coating composition or the like comprising such ingredients is heated at a temperature of 50° to 200° C., preferably 80° to 150° C., isocyanate groups are regenerated from the blocked isocyanate groups in the presence or absence of the curing catalyst and react with hydroxyl groups, forming urethane bonds to give a three-dimensional crosslinked structure.

In using the self-crosslinking resin of the present invention as a coating composition, the composition can be applied to substrates, for example, by electrophoretic coating, electrostatic coating, spray coating, dip coating or brush coating.

In the case of electrophoretic coating, for example, the article to be coated is placed into an electrophoretic bath containing the self-crosslinking resin, and a voltage of about 100 to 300 V is applied for about 1 to about 10 minutes to the article serving as a cathode, whereby the resin is deposited on the article. The article is then withdrawn from the bath, washed with water and thereafter baked at about 100° to about 150° C. for 10 to 60 minutes, whereby the blocked isocyanate groups in the resin are regenerated to isocyanate groups, which react with hydroxyl groups, forming urethane bonds and giving a three-dimensionally crosslinked coating. Any articles can be coated by this method insofar as they are conductors, which are preferably iron, steel, aluminum, copper or like metal.

The present invention provides the following advantages.

(1) The self-crosslinking resins of the invention having both a blocked isocyanate group and a hydroxyl group are usable to give single-pack coating compositions. This completely eliminates the cumbersome procedure required, for example, of conventional thermally curable polyurethane coating compositions of the two-pack type, i.e., the procedure of measuring out specified amounts of two liquids immediately before use, mixing the liquids and applying the mixture within a period of time (pot life) during which it remains fully flowable.

(2) Since there is no need to use polymerizable monomers or solvents having active hydrogen in the NCO-containing monomer polymerization reaction system, the polymer (A) can be prepared without involving any gelation.

(3) In reacting the blocking agent with the polymer (A) to obtain the polymer (C), the reaction system is heated at a particular optimum temperature necessary for the blocking agent to react with isocyanate groups, so that blocking agents, such as phenol or oxime compounds, which are prone to coloration at high temperatures are usable for blocking at a temperature of up to about 80° C. without necessitating heating to a high temperature and without entailing any likelihood of coloration. Moreover, the blocking agent used is low in dissociation temperature (up to 100° C.) and is therefore advantageous for preparing compositions which are curable at low temperatures. Even if having a high dissociation temperature, the blocking agent can be reacted with the polymer (A) with ease free of any gelation.

(4) Since the polymer (A), the polyester resin resin (B) and the polymer (C) are individually prepared before the resin (I) or (II) is prepared, the molecular weight and the number of functional groups of the desired resin can be determined readily.

(5) The self-crosslinking resins of the invention can be easily prepared by polymerization and grafting free of gelation, coloration or like objection, and can further be made curable at a low temperature.

(6) Polyester resins having a high hydroxyl value (for example, of at least about 180 mg KOH/g resin) are generally not fully compatible with other coating resins (such as acrylic resins), whereas the resins of the present invention are free of this problem since the resin of the invention comprises a polyester resin and other resin, i.e., acrylic resin, combined therewith through a urethane bond. Consequently, the resins of the invention have the characteristics of the two component resins, i.e., curability, gloss, distinctness-of-image gloss, surface smoothness, chemical resistance, fatness, weather resistance, etc.

(7) The resin of the invention has a carboxyl group in the molecule, can therefore, be readily dissolved or dispersed in water to prepare an aqueous resin, and can further be made curable at a low temperature.

(8) Due to the carboxyl group present in the molecule, the cured coating of the present resin is superior in the weatherability, chemical resistance and adhesion to the cured coating of a carboxyl-free resin. This is presumably because the carboxyl group in the resin accelerates the crosslinking reaction, thereby imparting an increased crosslink density.

The present invention will be described below in greater detail with reference to the following examples, which nevertheless in no way limit the invention. The parts and percentates in the examples and comparative examples are all by weight.

EXAMPLE 1

Preparation of Polymer (A)

Methyl ethyl ketone (45 parts) was placed into a reactor equipped with a stirrer, reflux condenser and thermometer, and was maintained at 110° C. with heating. The following mixture was added dropwise to the ketone over a period of 3 hours.

| | |
|---|---|
| m-Isopropenyl-α,α'-dimethylbenzyl isocyanate | 50 parts |
| n-Butyl acrylate | 40 parts |
| 2-Ethylhexyl acrylate | 10 parts |
| t-Butylperoxyisopropyl carbonate | 4 parts |

Subsequently, a mixture of 35 parts of methyl ethyl ketone and 1.0 part of t-butylperoxyisopropyl caronate was added dropwise to the resulting mixture over a period of 1 hour, followed by aging at 120° C. for 3 hours and further by removal of 12 parts of methyl ethyl ketone in a vacuum. The reaction mixture will be referred to as a "vinyl polymer solution (A1)". The resin solution obtained was 70% in solids content and was a light yellow transparent liquid. The solution was D in Gardner viscosity (as measured by a Gardner bubble viscometer at 25° C., the same as hereinafter), about 8000 in weight average molecular weight and 100 g/1000 g resin in isocyanate value.

Preparation of Hydroxyl—and Carboxyl-Containing Polyester Resin (B)

Into a reactor equipped with a stirrer, reflux condenser, rectification column and thermometer was placed a mixture of 30.71 parts of trimethylolpropane, 44.25 parts of 1,6-hexanediol, 64 parts of butyl ethyl pentyl glycol, 68.8 parts of cyclohexanedicarboxylic acid and 66.4 parts of isophthalic acid, and the mixture was reacted with stirring in a nitrogen atmosphere at 160° to 230° C. for 9 hours to obtain a polyester resin which was 0.8 in dibasic acid ratio, 142.9 mg KOH/g resin in hydroxyl value and 4 mg KOH/g resin in acid value. The polyester resin was then maintained at 150° C. and reacted with 30.57 parts of phthalic anhydride for 3 hours for half-esterification to introduce free carboxyl groups into the resin skeleton and increase the acid value to 46 mg KOH/g resin. The resin was thereafter dissolved in diethylene glycol dimethyl ether to obtain a polyester resin solution. The resin solution obtained was 70% in solids content, 0.8 in dibasic acid ratio, 102.9 mg KOH/g resin in hydroxyl value, 46 mg KOH/g resin in acid value and 6000 in weight average molecular weight. The reaction mixture will be referred to as a "polyester resin solution (B1)".

Preparation of Self-Crosslinking Resin (I)

Into a reactor equipped with a stirrer, reflux condenser and thermometer were placed 1428 parts of the vinyl polymer solution (A1) and 2071 parts of the polyester resin solution (B1), which were mixed together at room temperature (25° C.). The mixture was found to be 40.8 g/1000 g resin in isocyanate value. (This value was taken as the initial isocyanate value.) The mixture was then reacted with stirring at 40° C. for about 3 hours. When the isocyanate value decreased to 38.6 g/1000 g resin, 205.7 parts of methyl ethyl ketoxime was added to the mixture, followed by aging at 60° C. for 2 hours and thereafter by the addition of 130 parts of butyl cellosolve for dilution.

The above procedure gave a self-crosslinking resin solution which was 69% in solids content, 56.4 mg KOH/g resin in hydroxyl value, 25.2 mg KOH/g resin in acid value, 38.6 g/1000 g resin in isocyanate value, 13000 in weight average molecular weight and 0.9 in NCO/OH (mole) ratio. The solution will be referred to as a "self-crosslinking resin solution (I-1)".

To 1000 parts of the self-crosslinking resin solution (I-1) was added dropwise a mixture of 50 parts of isopropanol, 27.6 parts of dimethylaminoethanol and 330 parts of deionized water, and 892.4 parts of deionized water was further added to the mixture, affording an aqueous self-crosslinking resin solution (I-1') having a solids content of 30%. The resin solution was stored at 25° C. for 2 months, but no increase was found in its viscosity.

EXAMPLE 2

A clear coat composition comprising an aqueous self-crosslinking resin and having a solids content of 30% was prepared by adding to the aqueous self-crosslinking resin solution (I-1') with a solids content of 30% 0.2 part of 50% butyl cellosolve solution of dibutyltin dibenzoate per 100 parts of the solids of the resin solution (I-1'). The composition was stored at 25° C. for 2 months, but no increase was found in its viscosity.

EXAMPLE 3

Preparation of Polymer (A)

A resin solution was prepared in the same manner as the vinyl polymer solution (A) of Example 1 using the following mixture.

| | |
|---|---|
| m-Isopropenyl-α,α'-dimethylbenzyl isocyanate | 60 parts |
| n-Butyl acrylate | 35 parts |
| Methyl acrylate | 5 parts |
| t-Butylperoxyisopropyl carbonate | 4 parts |

The resin solution (vinyl polymer solution (A2)) obtained contained 70% of solids and was a light yellow transparent liquid. The solution was about 8000 in weight average molecular weight and 120 g/1000 g resin in isocyanate value.

Preparation of Hydroxyl—and Carboxyl-Containing Polyester Resin (B)

Trimethylolpropane (40.95 parts), 18.4 parts of glycerin, 31 parts of ethylene glycol, 66.4 parts of isophthalic acid, 61.6 parts of hexahydrophthalic anhydride and 84 parts of soybean oil fatty acid were reacted under the same conditions as in Example 1 for 12 hours to obtain a polyester resin which was 0.8 in dibasic acid ratio, 122 mg KOH/g resin in hydroxyl value, 10 mg KOH/g resin in acid value and 30.5 in oil length (amount in wt. % of fatty acid component of the resin).

The polyester resin was then maintained at 150° C. and reacted with 42.8 parts of phthalic anhydride added thereto for 4 hours for half-esterification to introduce free carboxyl groups into the resin skeleton and increase the acid value to 61 mg KOH/g resin. The resin was thereafter dissolved in diethylene glycol dimethyl ether to obtain a polyester resin solution. The resin solution obtained was 70% in solids contained, 0.8 in dibasic acid ratio, 71 mg KOH/g resin in hydroxyl value, 46 mg KOH/g resin in acid value and about 16000 in weight average molecular weight.

The resin solution will be referred to as a "polyester resin solution (B2)".

Preparation of Self-Crosslinking Resin (II)

Into a reactor equipped with a stirrer, reflux condenser and thermometer were added 1428 parts of the vinyl polymer solution (A2) and 237 parts of methyl ethyl ketoxime, which were then reacted at 50° C. for 2 hours in a nitrogen gas stream. To the reaction mixture was thereafter added 3572 parts of the polyester resin solution (B2), and the mixture was reacted at 60° C. in a nitrogen atmosphere until the free isocyanate groups became absent. Subsequently, 24 parts of methyl ethyl ketoxime and 179 parts of butyl cellosolve were added to the reaction mixture for dilution.

The above procedure gave a self-crosslinking resin solution which was 69% in solids content, 47.5 mg KOH/g resin in hydroxyl value, 20.7 mg KOH/g resin in acid value, 32.0 g/1000 g resin in isocyanate value, 0.9 in NCO/OH (mole) ratio and 22000 in weight average molecular weight. The resin solution will be referred to as a "self-crosslinking resin solution (II-1)".

To 1000 parts of the self-crosslinking resin solution (II-1) was added dropwise a mixture of 50 parts of isopropanol, 22.7 parts of dimethylaminoethanol and 330 parts of deionized water, and thereafter 897 parts of deionized water was added to the mixture, giving an aqueous self-crosslinking resin solution (II-1') having a solids content of 30%. The resin solution was stored at 25° C. for 2 months, but no increase was found in its viscosity.

EXAMPLE 4

To the aqueous self-crosslinking resin solution (II-1') having a solids content of 30% was added a 50% butyl cellosolve solution of dibutyltin dibenzoate in an amount of 0.2 part per 100 parts of the solids of the resin solution (II-1') to prepare a clear coat composition comprising an aqueous self-crosslinking resin and having a solids content of 30%. The composition was stored at 25° C. for 2 months, but no increase was found in its viscosity.

EXAMPLE 5

Preparation of Polymer (A)

A resin solution was prepared under the same conditions as the vinyl polymer solution (A) of Example 1 using the following mixture.

| | |
|---|---|
| m-Isopropenyl-α,α'-dimethylbenzyl isocyanate | 60 parts |
| n-Butyl acrylate | 35 parts |
| Styrene | 5 parts |
| t-Butylperoxyisopropyl carbonate | 5 parts |

The resin solution (vinyl polymer solution (A3)) obtained contained 70% of solids and was a light yellow transparent liquid. The solution was about 5500 in weight average molecular weight and 120 g/1000 g resin in isocyanate value.

Preparation of Hydroxyl—and Carboxyl-Containing Polyester Resin (B)

A mixture of 54.6 parts of trimethylolpropane, 23.6 parts of 1,6-hexanediol, 64 parts of butyl ethyl propylene glycol, 68.8 parts of cyclohexanedicarboxylic acid and 66.4 parts of isophthalic acid was reacted with stirring at 160° to 230° C. in a nitrogen gas atmosphere to obtain a polyester resin which was 0.8 in dibasic acid ratio, 184.5 mg KOH/g resin in hydroxyl value and 4 mg KOH/g resin in acid value.

Subsequently, 41.3 parts of phthalic anhydride was added to the polyester resin, and the mixture was reacted at 150° C. for 3 hours. The reaction mixture was thereafter dissolved in diethylene glycol dimethyl ether, giving a polyester resin solution which was 70% in resin solids content, 0.8 in dibasic acid ratio, 130.5 mg KOH/g resin in hydroxyl value, 60 mg KOH/g resin in acid value and 10000 in weight average molecular weight. The resin solution will be referred to as a "polyester resin solution (B3)".

Preparation of Self-Crosslinking Resin (I)

Into the same device as used in Example 1 were placed 1428 parts of the vinyl polymer solution (A3) and 1942.8 parts of the polyester resin solution (B3), which were then mixed together at room temperature (25° C.). The mixture was found to be 50.8 g/1000 g resin in isocyanate value. (This value was taken as the initial isocyanate value.) The mixture was subsequently reacted for about 2 hours with stirring and heating at 40° C. When the isocyanate value decreased to 47.6 g/1000 g resin, 245 parts of methyl ethyl ketoxime was added to the reaction mixture, followed by aging at 60° C. for 2 hours. The resulting mixture was thereafter diluted with 142 parts of butyl cellosolve.

The above procedure gave a self-crosslinking resin solution which was 69% in solids content, 68.4 mg KOH/g resin in hydroxyl value, 31.4 mg KOH/g resin in acid value, 47.6 g/1000 g resin in isocyanate value, 0.9 in NCO/OH (mole) ratio and 14000 in weight average molecular weight. The resin solution will be referred to as a "self-crosslinking resin solution (I-2)".

To 1000 parts of the self-crosslinking resin solution (I-2) was added dropwise a mixture of 50 parts of isopropanol, 34.3 parts of dimethylaminoethanol and 330 parts of deionized water with stirring, and 885.7 parts of deionized water was thereafter added to the mixture, affording an aqueous self-crosslinking resin solution (I-2') having a solids content of 30%. The resin solution (I-2') was stored at 25° C. for 2 months, but no increase was found in its viscosity.

EXAMPLE 6

To the aqueous self-crosslinking resin solution (I-2') having a solids content of 30% was added 50% butyl cellosolve solution of dibutyltin dibenzoate in an amount of 0.2 part per 100 parts of the solids of the resin solution (I-2') to prepare a clear coat composition comprising an aqueous self-crosslinking resin and having a solids content of 30%. The composition was stored at 25° C. for 2 months, but no increase was found in its viscosity.

EXAMPLE 7

Prepartion of Self-Crosslinking Resin (II)

In the same reactor as used for preparing the self-crosslinking resin solution (II) of Example 3, 232 parts of methyl ethyl ketoxime was added to 1428 parts of the vinyl polymer solution (A3), and the mixture was reacted at 50° C. for 2 hours in a nitrogen stream. To the reaction mixture was thereafter added 1942.8 parts of the polyester resin solution (B3), and the mixture was reacted at 60° C. in a nitrogen stream until no free isocyanate groups remained any longer. The resulting mixture was diluted with 13 parts and 142 parts of methyl ethyl ketoxime and butyl cellosolve, respectively.

The above procedure gave a self-crosslinking resin solution which was 69% in solids content, 68.4 mg KOH/g resin in hydroxyl value, 31.4 mg KOH/g resin in acid value, 46.1 g/1000 g resin in isocyanate value and 0.9 in NCO/OH (mole) ratio. The resin solution will be referred to as a "self-crosslinking resin solution (II-2)".

To 1000 parts of the self-crosslinking resin solution (II-2) was added dropwise a mixture of 50 parts of isopropanol, 34.3 parts of dimethylaminoethanol and 330 parts of deionized water with stirring, and 885.7 parts of deionized water was thereafter added to the mixture, giving an aqueous self-crosslinking resin solution (II-2') having a solids content of 30%. The resin solution (II-2') was stored at 25° C. for 2 months, but no increase was found in its viscosity.

EXAMPLE 8

To the aqueous self-crosslinking resin solution (II-2') having a solids content of 30% was added a 50% butyl cellosolve solution of dibutyltin dibenzoate in an amount of 0.2 part per 100 parts of the solids of the resin solution (II-2') to prepare a clear coat composition comprising an aqueous self-crosslinking resin and having a solids content of 30%. The composition was stored at 25° C. for 2 months, but no increase was found in its viscosity.

EXAMPLE 9

To 145 parts of the self-crosslinking resin solution (I-2') of Example 5 were added 0.5 part of dibutyltin dilaurate and 21.7 parts of xylene to prepare a clear coat composition comprising a self-crosslinking resin and having a solids content of 60%. The clear coat composition was stored at 25° C. for 2 months, but no increase was found in its viscosity.

EXAMPLE 10

To 145 parts of the self-crosslinking resin solution (II-2) of Example 7 were added 0.5 part of dibutyltin dilaurate and 21.7 parts of xylene to prepare a clear coat composition comprising a self-crosslinking resin and having a solids content of 60%. The clear coat composition was stored at 25° C. for 2 months, but no increase was found in its viscosity.

COMPARATIVE EXAMPLE 1

A clear coat composition was prepared by mixing together 610 parts of the polyester resin solution (B1), 487.5 parts of "80% Coronate 2507" (completely blocked hexamethylene diisocyanate manufactured by Nippon Polyurethane Industry Co., Ltd.) and 0.5 part, per 100 parts of the resin solids, of dibutyltin dilaurate. The composition was satisfactory in storage stability.

COMPARATIVE EXAMPLE 2

A clear coat composition was prepared by mixing together 610 parts of the polyester resin solution (B1), 487.5 parts of "80% Coronate 2507" and 0.9 part, per 100 parts of the resin solids, of dibutyltin diacetate. The composition was satisfactory in storage stability.

COMPARATIVE EXAMPLE 3

A mixture was prepared from 1428 parts of the polyester resin solution (B3), 375 parts of "80% Coronate 2507" and 0.9 part, per 100 parts of the resin solids, of dibutyltin dilaurate, but the main components were incompatible with each other and separated into different phases. The mixture was applied to a glass panel to a thickness of 40 μm (when dried) and baked at 140° C. for 30 minutes, whereas the mixture did not fully cure, failing to give a transparent coating.

The solutions or compositions of Examples and Comparative Examples were tested for storage stability, and also applied to tinplate to a thickness, as dried, of about 40 μm, baked at 120° C. or 140° C. for 30 minutes and thereafter checked for gel fraction ratio and xylol wipability. Table 1 shows the results. The test methods were as follows.

Storage stability

The sample was stored at 30° C. for 1 month, and if the resulting increase in viscosity was not greater than two reference increments of Gardner viscosity, the result was evaluated as "good".

Gel fraction ratio

The coating removed from the tinplate was subjected to extraction for 6 hours in a solvent mixture of acetone and methanol (1:1) under reflux, and the weight ratio of the resulting coating to the coating before extraction was determined.

Xylol wipability

The coating was forcibly rubbed with a piece of gauze wet with xylol reciprocatingly 20 times over a stroke length of 10 cm and thereafter checked for scratches or hazing. The result was evaluated according to the following crieteria.

A: No scratches or hazing
B: Some scratches or slight hazing
C: Many scratches or considerable hazing

TABLE 1

|  | Curing catalyst | Storage stability | Gel fraction ratio (baking at 120° C./140° C.) | Xylol wipability |
| --- | --- | --- | --- | --- |
| Example 1 | None | Good | 93/96 | A |
| Example 2 | DBTDB | Good | 97/97 | A |
| Example 3 | None | Good | 92/95 | A |
| Example 4 | DBTDB | Good | 96/97 | A |
| Example 5 | None | Good | 92/97 | A |
| Example 6 | DBTDB | Good | 96/98 | A |
| Example 7 | None | Good | 93/96 | A |
| Example 8 | DBTDB | Good | 96/98 | A |
| Example 9 | DBTDL | Good | 97/98 | A |
| Example 10 | DBTDL | Good | 98/98 | A |
| Comp. Ex. 1 | DBTDL | Good | 34/52 | C |
| Comp. Ex. 2 | DBTDA | Good | 43/83 | C |
| Comp. | DBTDL | Phase | 37/77 | C |

TABLE 1-continued

| | Curing catalyst | Storage stability | Gel fraction ratio (baking at 120° C./140° C.) | Xylol wipability |
|---|---|---|---|---|
| Ex. 3 | | separation | | |

In the above table, DBTDL stands for dibutyltin dilaurate, DBTDA for dibutyltin diacetate, and DBTDB for dibutyltin dibenzoate.

We claim:

1. A self-crosslinking resin having a carboxyl group, a blocked isocyanate group and a hydroxyl group in the molecule and characterized in that the resin is prepared from a vinyl polymer (A) having at least two free isocyanate groups in the molecule and a polyester resin (B) having at least two hydroxyl groups and at least one carboxyl group in the molecule by reacting some of the hydroxyl groups of the resin (B) with some of the free isocyanate groups of the polymer (A), and subsequently reacting a blocking agent with all the remaining free isocyanate groups.

2. A self-crosslinking resin as defined in claim 1 wherein the vinyl polymer (A) is a polymer containing at least one isocyanate-containing vinyl monomer selected from 2-isocyanate ethyl methacrylate, m-isopropenyl-$\alpha,\alpha'$-dimethylbenzyl isocyanate and an adduct of 2-hydroxyethyl acrylate with isophorone diisocyanate and optionally further comprising other vinyl monomer or is a partially blocked product thereof.

3. A self-crosslinking resin as defined in claim 1 which is about 1000 to about 120000 in weight average molecular weight.

4. A self-crosslinking resin as defined in claim 1 which is about 15 to about 200 mg KOH/g resin in acid value.

5. A self-crosslinking resin as defined in claim 1 which is about 5 to about 400 mg KOH/g resin in hydroxyl value and about 5 to about 250 g/1000 g resin in isocyanate value.

6. An aqueous self-crosslinking resin composition characterized in that the composition is obtained by optionally neutralizing the carboxyl group of the self-crosslinking resin defined in claim 1 with a base, and subsequently dissolving or dispersing the resin in water or a mixture of water and a hydrophilic organic liquid.

7. A self-crosslinking resin having a carboxyl group, a blocked isocyanate group and a hydroxyl group in the molecule and characterized in that the resin is prepared from a vinyl polymer (C) having a free isocyanate group and a blocked isocyanate group in the molecule and a polyester resin (B) having at least two hydroxyl groups and at least one carboxyl group in the molecule by reacting some of the hydroxyl groups of the resin (B) with all the free isocyanate groups of the polymer (C).

8. A self-crosslinking resin as defined in claim 7 wherein the vinyl polymer (C) is a partially blocked product of a polymer containing at least one isocyanate-containing vinyl monomer selected from 2-isocyanate ethyl methacrylate, m-isopropenyl-$\alpha,\alpha'$-dimethylbenzyl isocyanate and an adduct of 2-hydroxyethyl acrylate with isophorone diisocyanate and optionally further comprising other vinyl monomer.

9. A self-crosslinking resin as defined in claim 7 which is about 1000 to about 120000 in weight average molecular weight.

10. A self-crosslinking resin as defined in claim 7 which is about 15 to about 200 mg KOH/g resin in acid value.

11. A self-crosslinking resin as defined in claim 7 which is about 5 to about 400 mg KOH/g resin in hydroxyl value and about 5 to about 250 g/1000 g resin in isocyanate value.

12. An aqueous self-crosslinking resin composition characterized in that the composition is obtained by optionally neutralizing the carboxyl group of the self-crosslinking resin defined in claim 7 with a base, and subsequently dissolving or dispersing the resin in water or a mixture of water and a hydrophilic organic liquid.

* * * * *